(12) United States Patent
Chou

(10) Patent No.: US 11,053,981 B2
(45) Date of Patent: Jul. 6, 2021

(54) METHOD OF MOUNTING A BEARING TO AN AIR COMPRESSOR, AND AIR COMPRESSOR HAVING A BEARING MOUNTED BY THE METHOD

(71) Applicant: UNIK WORLD INDUSTRIAL CO., LTD., Tainan (TW)

(72) Inventor: Wen-San Chou, Tainan (TW)

(73) Assignee: UNIK WORLD INDUSTRIAL CO., LTD., Tainan (TW)

(*) Notice: Subject to any disclaimer, the term of this patent is extended or adjusted under 35 U.S.C. 154(b) by 246 days.

(21) Appl. No.: 16/205,183

(22) Filed: Nov. 29, 2018

(65) Prior Publication Data
US 2019/0170192 A1 Jun. 6, 2019

(30) Foreign Application Priority Data

Nov. 30, 2017 (TW) .................. 106141963

(51) Int. Cl.
| | |
|---|---|
| *F16C 35/063* | (2006.01) |
| *F04B 39/14* | (2006.01) |
| *F04B 35/01* | (2006.01) |
| *F04B 39/00* | (2006.01) |
| *B23P 15/00* | (2006.01) |
| *F04B 35/00* | (2006.01) |
| *F04B 53/00* | (2006.01) |
| *F04B 53/22* | (2006.01) |
| *F04B 53/14* | (2006.01) |

(52) U.S. Cl.
CPC ............ *F16C 35/063* (2013.01); *B23P 15/00* (2013.01); *F04B 35/002* (2013.01); *F04B 35/01* (2013.01); *F04B 39/0094* (2013.01); *F04B 39/14* (2013.01); *F04B 53/006* (2013.01); *F04B 53/14* (2013.01); *F04B 53/22* (2013.01); *F16C 2226/52* (2013.01); *F16C 2360/42* (2013.01); *Y10T 29/49696* (2015.01)

(58) Field of Classification Search
CPC .............. F16C 35/063; F16C 2226/52; F16C 2360/42; F16C 19/16; F16C 3/02; B23P 15/00; F04B 39/14; F04B 35/01; F04B 39/0094; F04B 35/002; F04B 53/006; F04B 53/22; F04B 53/14; Y10T 29/49696; B21D 43/003; B21D 22/02
See application file for complete search history.

(56) References Cited

U.S. PATENT DOCUMENTS

2015/0330379 A1* 11/2015 Chou .................... F16F 15/262
417/374

* cited by examiner

*Primary Examiner* — Lee A Holly

(57) ABSTRACT

A method of mounting a bearing to an air compressor including a shaft element having a first end defining a central cylindrical recess and a second is disclosed, which includes the steps of: fixing the second end of the shaft element to a center of a gear; inserting the first end of the shaft element through a central hole of a bearing to have an annular step of the shaft element abutted an inner ring of the bearing; and hitting the first end of the shaft element by a striking tool with a central pin to form an outwardly extending rim on the first end of the shaft element. With the method, the bearing can be firmly fixed between the outwardly extending rim and the annular step of the shaft element.

3 Claims, 12 Drawing Sheets prior art prior art prior art prior art prior art

METHOD OF MOUNTING A BEARING TO AN AIR COMPRESSOR, AND AIR COMPRESSOR HAVING A BEARING MOUNTED BY THE METHOD

TECHNICAL FIELD OF THE INVENTION

The present invention relates to a method of mounting a bearing to an air compressor, and an air compressor having a bearing mounted by the method, wherein a striking tool is employed to hit one end of a shaft element to form an outwardly extending rim on the end of the shaft element, so that the bearing can be firmly connected with the shaft element.

DESCRIPTION OF THE PRIOR ART

FIGS. 10 and 11 show a conventional air compressor 1 for vehicles, which basically comprises a base frame 11, a cylinder 12 joined to the base frame 11, a motor 13 mounted to the base 11, and a piston 14 fitted to the cylinder 12. Through a gear mechanism 15 and a crank mechanism, the motor 13 can drive the piston 14 to conduct reciprocating motion within the cylinder 12. The reciprocating motion includes an intake stroke for allowing air to enter the cylinder 12 and a compression stroke for compressing air in the cylinder 12 and forcing the compressed air out of the cylinder 12.

The gear mechanism 15 includes a first gear 151 (i.e., the driving gear), which is mounted at an axle 131 of the motor 13, and a second gear 152 (i.e., the driven gear) engaged with the first gear 151. The crank mechanism includes a counterweight 161 provided at the second gear 152, a crankshaft 162, and a crankpin 164. One end of the crankshaft 162 is fixed to a center of the second gear 152, and the other end of the crankshaft 162 is fitted through a bearing 111 located in a mounting hole 110 of the base frame 11 and fixed by a screw 17 (with external threads 171) being screwed into a threaded hole 163 of the crankshaft 162 (see FIGS. 9 and 10). In one embodiment, the other end of the crankshaft 162 can be fitted through a metal bush 112 located in a mounting hole 110 of the base frame 11, so that a snap ring 18 can be engaged with an annular groove 165 of the crankshaft 162 (see FIG. 8). The crankpin 164 is fixed to the counterweight 161 and the second gear 152. The piston 14 is connected to the crankpin 164 such that the hole 143 defined at the bottom end 142 of the rod portion 141 is fitted around the crankpin 164. Since the crankpin 164 is at an offset from the crankshaft 162, when the second gear 152 is rotated by the first gear 151, the crankpin 164 can be driven to swing in a circle around the crankshaft 162, which allows the piston 14 to conduct reciprocating motion within the cylinder 12.

FIG. 8 shows a conventional air compressor, one disadvantage of which is that the snap ring 18 is easily loosened or detached from the crankshaft 162 after the compressor has been used for a period of time. In another conventional air compressor, as shown in FIG. 9, due to insufficient depth or strength of the threads engagement between the screw 17 and a threaded hole 163 of the crankshaft 162, the screw 17 is easily loosened from the crankshaft 162. As a result, the metal bush 112 or the bearing 111 cannot be properly connected with the crankshaft 162. Another problem is that the main frame of an air compressor is usually made of plastic, which can be slightly softened at a higher temperature. Thus, the mounting hole 110 is liable to undergo a greater force at some area of the mounting hole 110 during the reciprocating motion of the piston 14. As the piston 14 continues conducting reciprocating motion, the mounting hole 110 can be gradually worn out. Thus, the rotational center of the crankshaft 162 may not be fixed at a point. As can be seen in FIG. 12, wherein the motion path of the crankshaft 162 is schematically indicated by the symbol (A), while the motion path of the crankpin 164 is schematically indicated by the symbol (C), which is non-circular. Under these circumstances, when the piston 14 conducts reciprocating motion within the cylinder 12, the motion path of the piston 14 may deviate from its normal path, as shown by the dashed lines in FIG. 11, thus reducing the performance of the air compressor, and furthermore, the deviation of the motion path of the piston may cause damages on the head portion 144 of the piston 14 and the bearing 111, thereby reducing the service life of the air compressor.

SUMMARY OF THE INVENTION

One object of the present invention is to provide a method of mounting a bearing to an air compressor and, more particularly, to a small compressor, which includes a shaft element having a first end and a second end. The method comprises the steps of: fixing the second end of the shaft element to a center of a gear; inserting the first end of the shaft element through a central hole of the bearing to have an annular step of the shaft element abutted an inner ring of the bearing; and hitting the first end of the shaft element by a striking tool to form an outwardly extending rim on the first end of the shaft element; whereby the bearing can be firmly fixed between the outwardly extending rim and the annular step of the shaft element.

Another object of the present invention is to provide an air compressor, which comprises a base frame, a cylinder with an air storage container, a gear, and a crank mechanism. The base frame defines a first mounting hole, which allows a pinion driven by a motor to pass, and a second mounting hole for receiving therein a bearing including an outer ring, an inner ring, and a plurality of rolling balls disposed therebetween. The cylinder is fixed to or formed integrally with the base frame. The air storage container is provided with one or more outlet tubes, and connected and communicated with the cylinder. The gear is disposed in mesh with the pinion. The crank mechanism includes a counterweight, a crankpin connected with a piston, and a shaft element having a first end, which defines a central cylindrical recess, and a second end, wherein the second end has a diameter greater than the first end, thus forming an annular step therebetween. The second end of the shaft element is fixed to a center of the gear. The first end of the shaft element is inserted through a central hole defined by the inner ring of the bearing and hitted by a striking tool with a central pin to form an outwardly extending rim on the first end of the shaft element, so that the bearing can be firmly fixed between the outwardly extending rim and the annular step of the shaft element.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
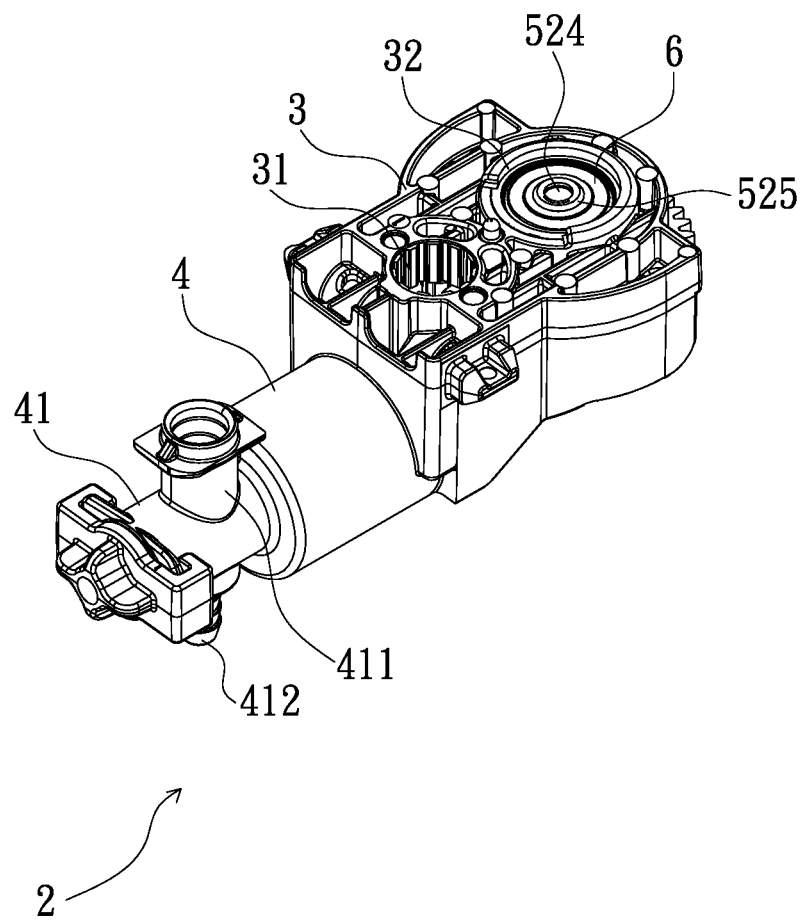
FIG. 1 shows a 3-dimensional view of a main structure of an air compressor.
Figure 2:
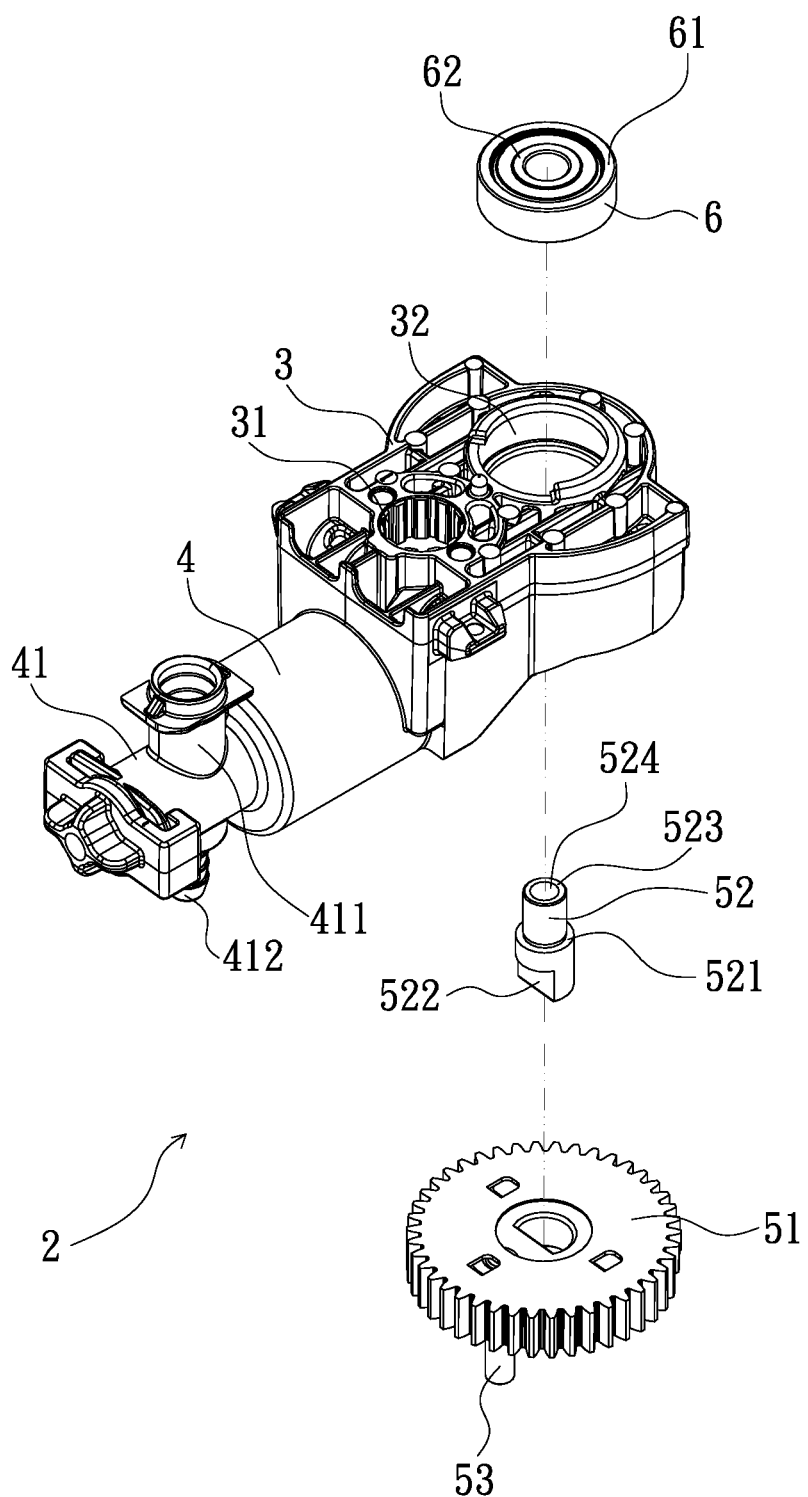
FIG. 2 shows a partially exploded view of the main structure of the air compressor.
Figure 3:
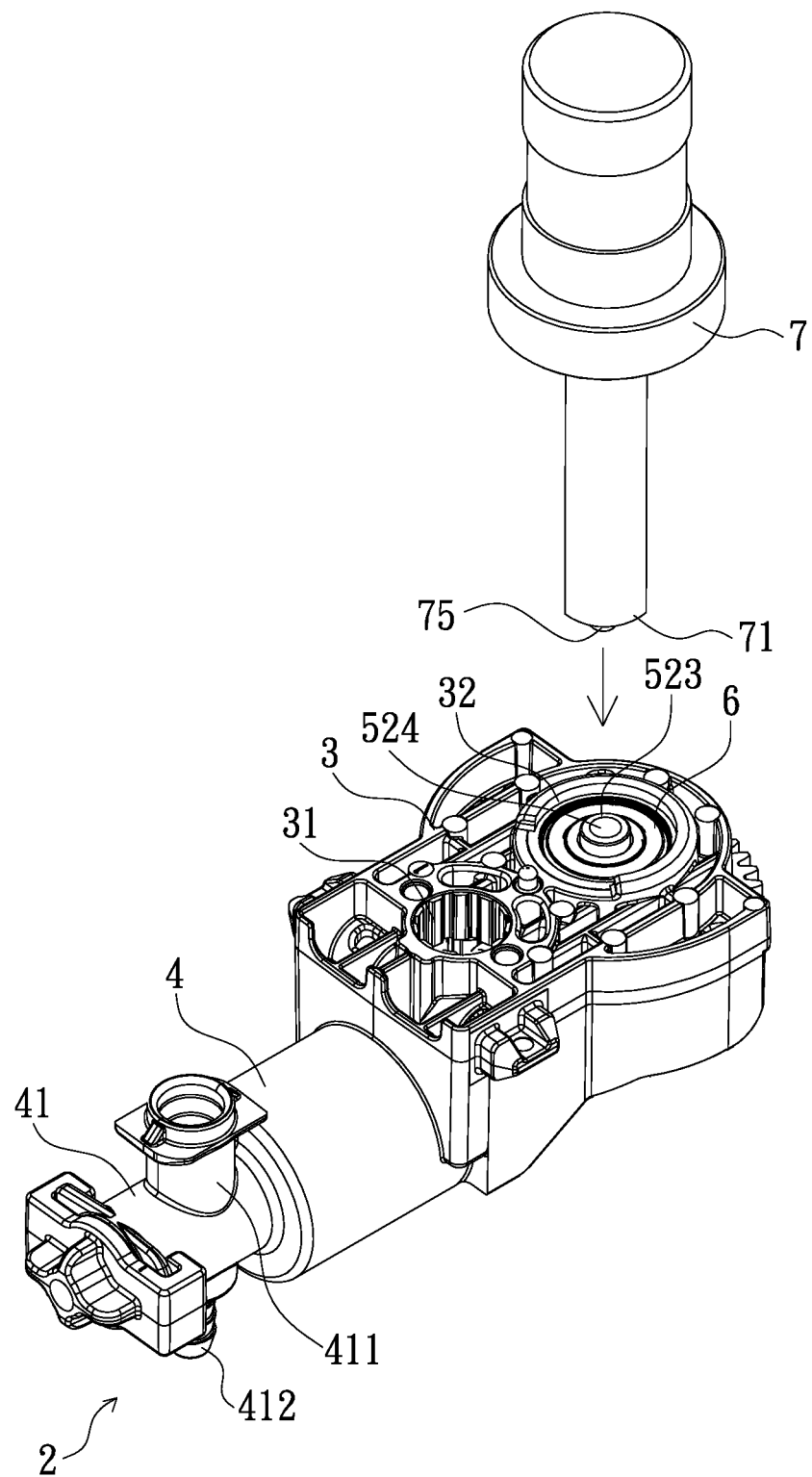
FIG. 3 shows a schematic working view of the present invention, wherein a striking tool is employed to hit one end of a shaft element for fixing a bearing in place.

FIGS. 1 and 2 show a main structure of a typical air compressor, through which a method of mounting a bearing to an air compressor and, more particularly, to a small compressor, will be illustrated. As shown, the air compressor, indicated by reference numeral 2, generally includes a base frame 3, a cylinder 4 with an air storage container 41, a gear 51, and a crank mechanism including a counterweight (not shown), a crankpin 53 connected with a piston (not shown), and a shaft element 52.

Figure 5:
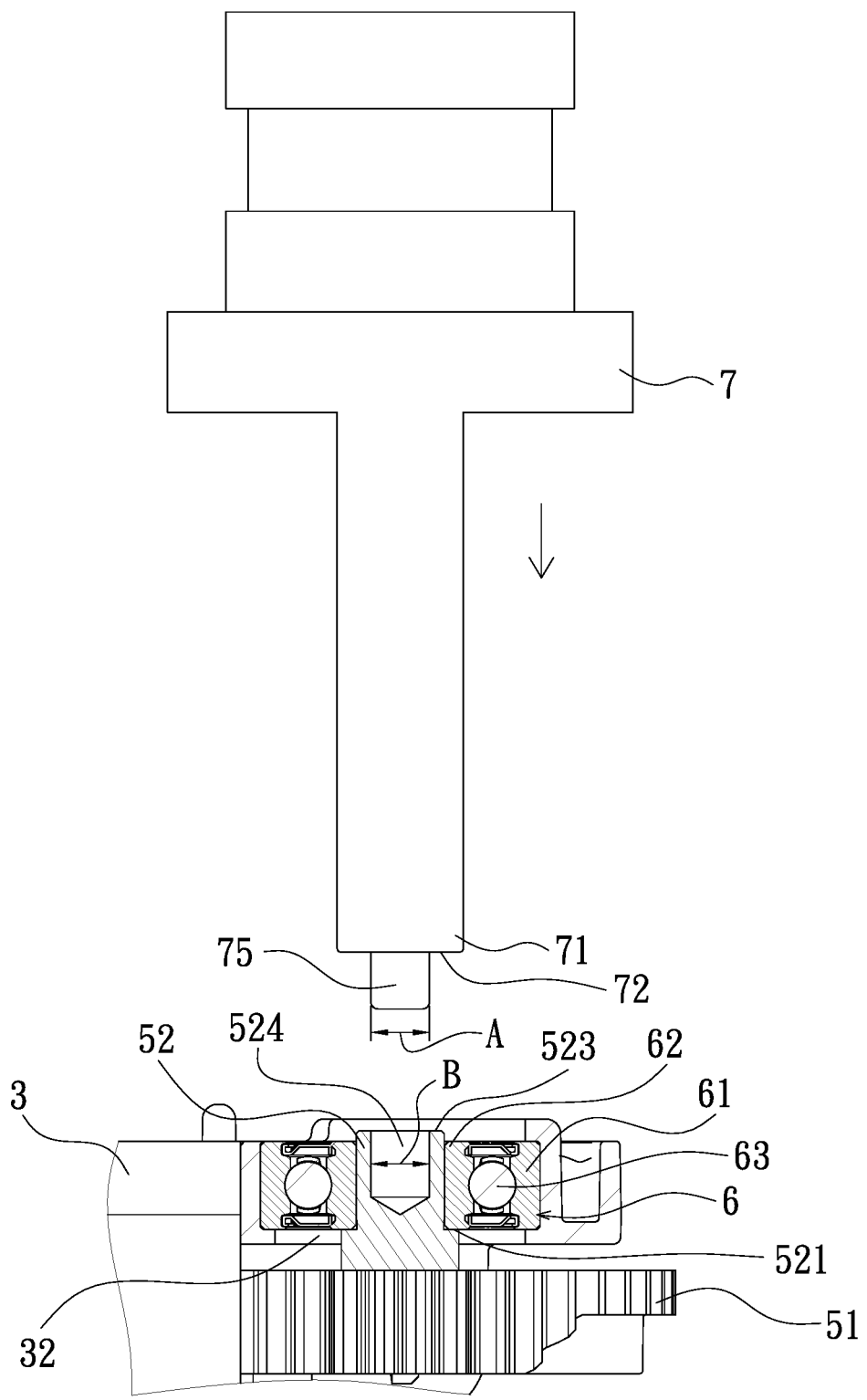
FIG. 5 shows a partial sectional view of the main structure of the air compressor, wherein the striking tool is approaching the shaft element to conduct a hitting operation.

The base frame 3 defines a first mounting hole 31, which allows a pinion (not shown) driven by a motor (not shown) to pass, and a second mounting hole 32 for receiving therein a bearing 6 which has an outer ring 61, an inner ring 62, and a plurality of rolling balls 63 disposed therebetween (see FIG. 5).

The cylinder 4 is fixed to or formed integrally with the base frame 3. The air storage container 41 is provided with one or more outlet tubes 411, 412, and connected and communicated with the cylinder 4. The outlet tubes 411, 412 can be connected with a hose, a relief valve, or a pressure gauge.

The gear 51 is disposed in mesh with the pinion (not shown). The counterweight (not shown) is provided on the gear 51. The shaft element 52, which serves as a crankshaft for the air compressor 2, can be made of a metal or alloy and has a first end and a second end opposite to the first end, wherein the second end has a diameter greater than the first end, thus forming an annular step 521 therebetween, the first end of the shaft element 52 has a annular peripheral wall, which defines a central cylindrical recess 524, and on which an annular surface 523 is formed. The shaft element 52 defines a cutout 522 at its second end so that the second end can be shaped as a non-circular portion, such as a semicircular portion. The gear 51 defines at its center a non-circular hole, such as a semicircular hole, corresponding to the non-circular portion formed at the second end of the shaft element 52.

Figure 6:
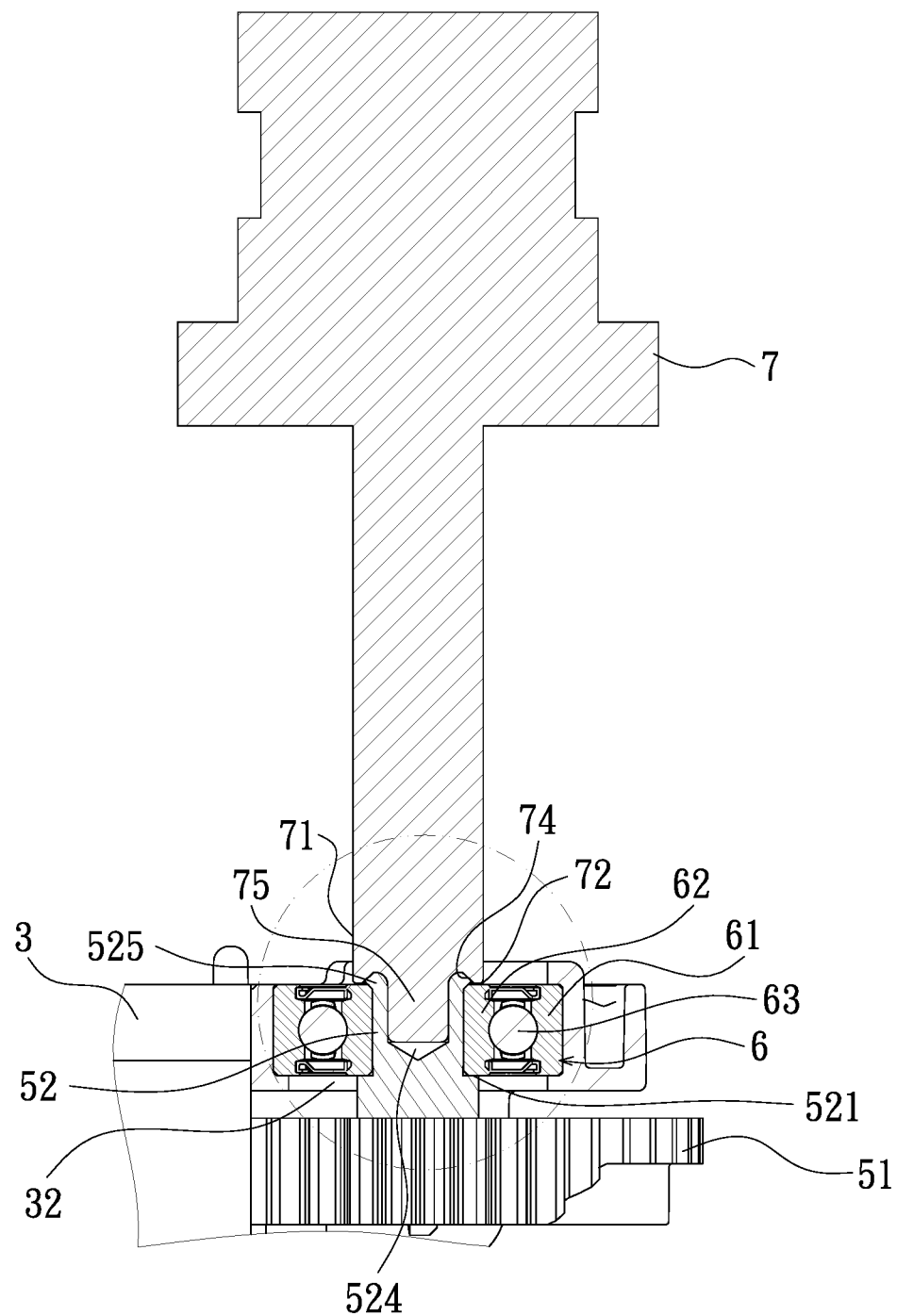
FIG. 6 shows a partial sectional view of the main structure of the air compressor, wherein the striking tool has completed the hitting operation.

The method of the present invention comprises the following steps:

Step 1: fixing the second end of the shaft element 52 to a center of the gear 51; for example, the second end of the shaft element 52 being snugly fitted into the corresponding hole defined at the center of the gear 51;

Step 2: inserting the first end of the shaft element 52 through the central hole of the bearing 6 to have the annular step 521 of the shaft element 52 abutted the inner ring 62 of the bearing 6 (see FIG. 5); and Step 3: hitting the first end of the shaft element 52 by a striking tool 7 to form an outwardly extending rim 525 on the first end of the shaft element 52 (see FIG. 6); as a result, the bearing 6 can be firmly fixed between the outwardly extending rim 525 and the annular step 521 of the shaft element 52.

Figure 4:
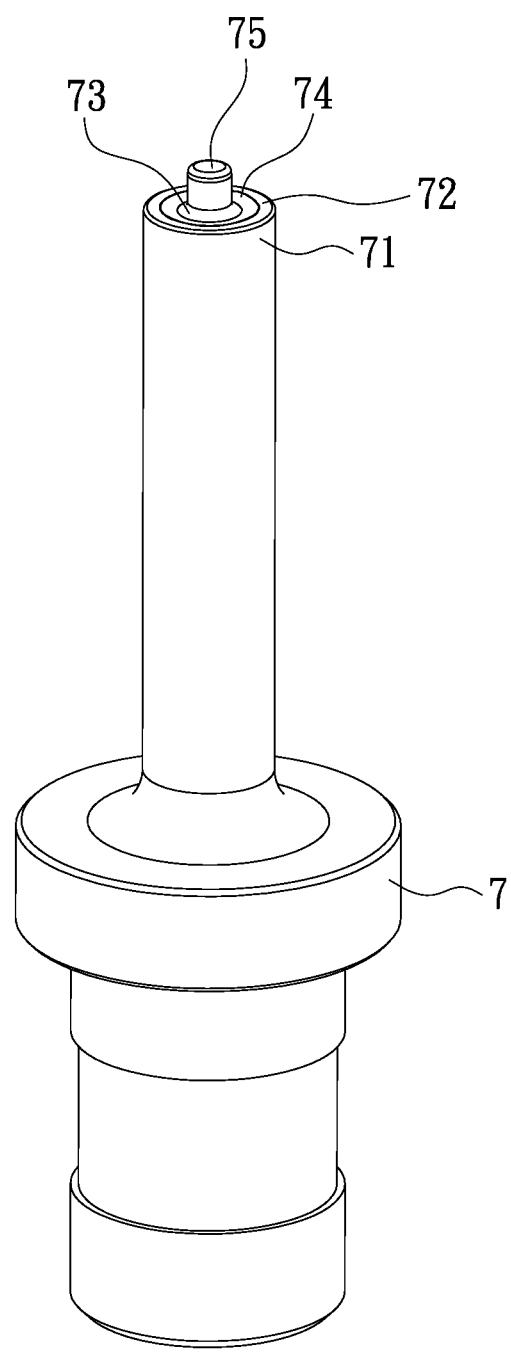
FIG. 4 shows a 3-dimensional view of the striking tool.
Figure 7:
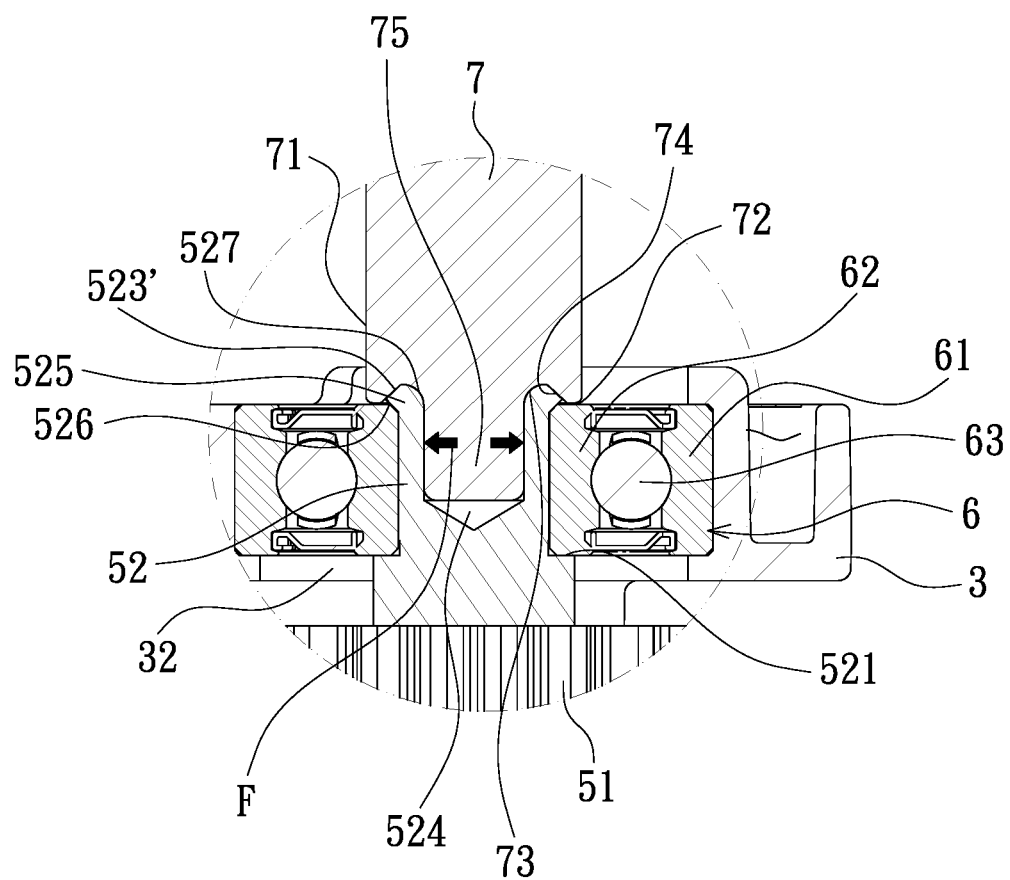
FIG. 7 shows a partial enlarged sectional view of a part circled in FIG. 6.
Figure 8:
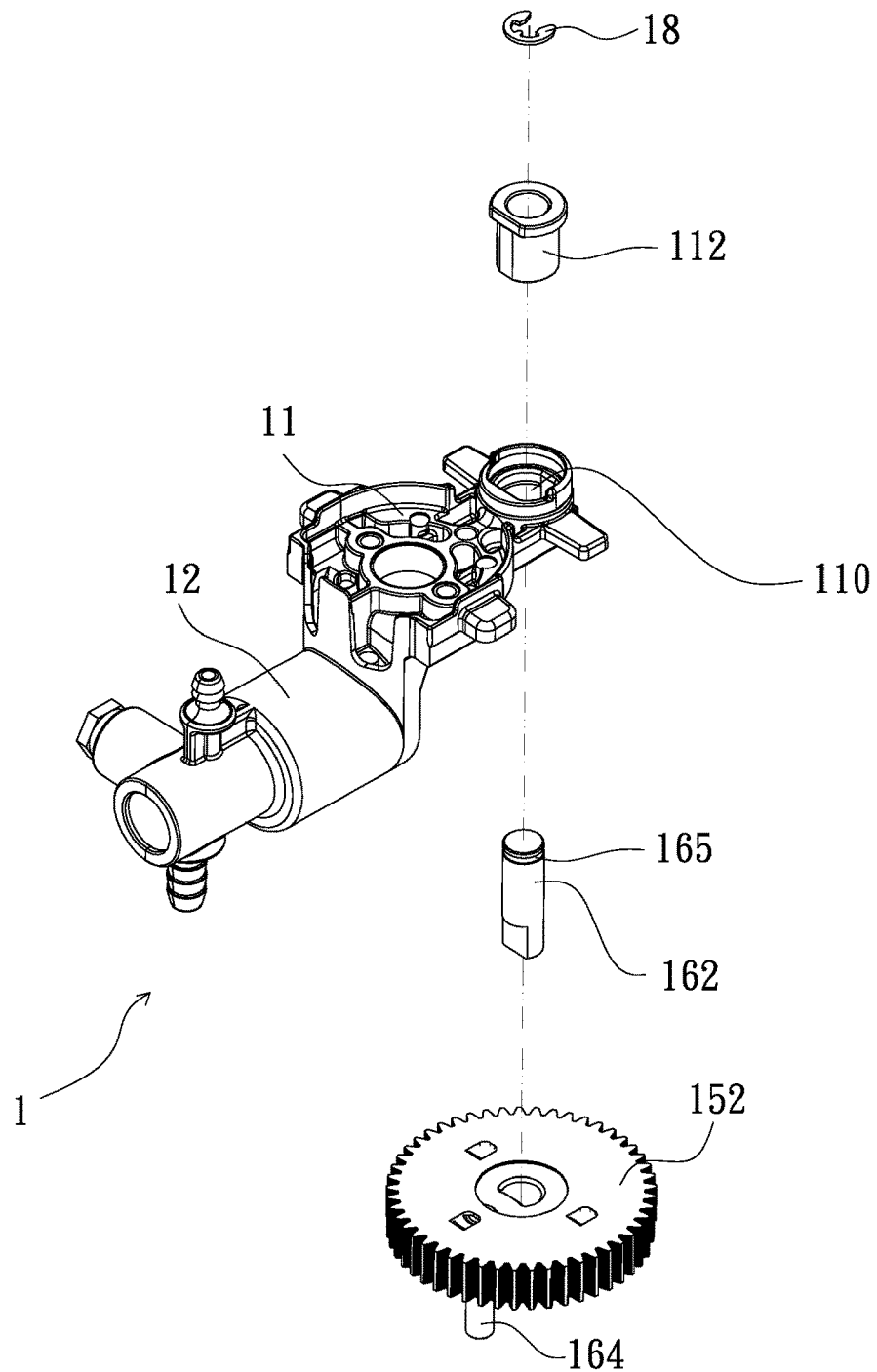
FIG. 8 shows a partial exploded view of a main structure of a prior-art air compressor.
Figure 9:
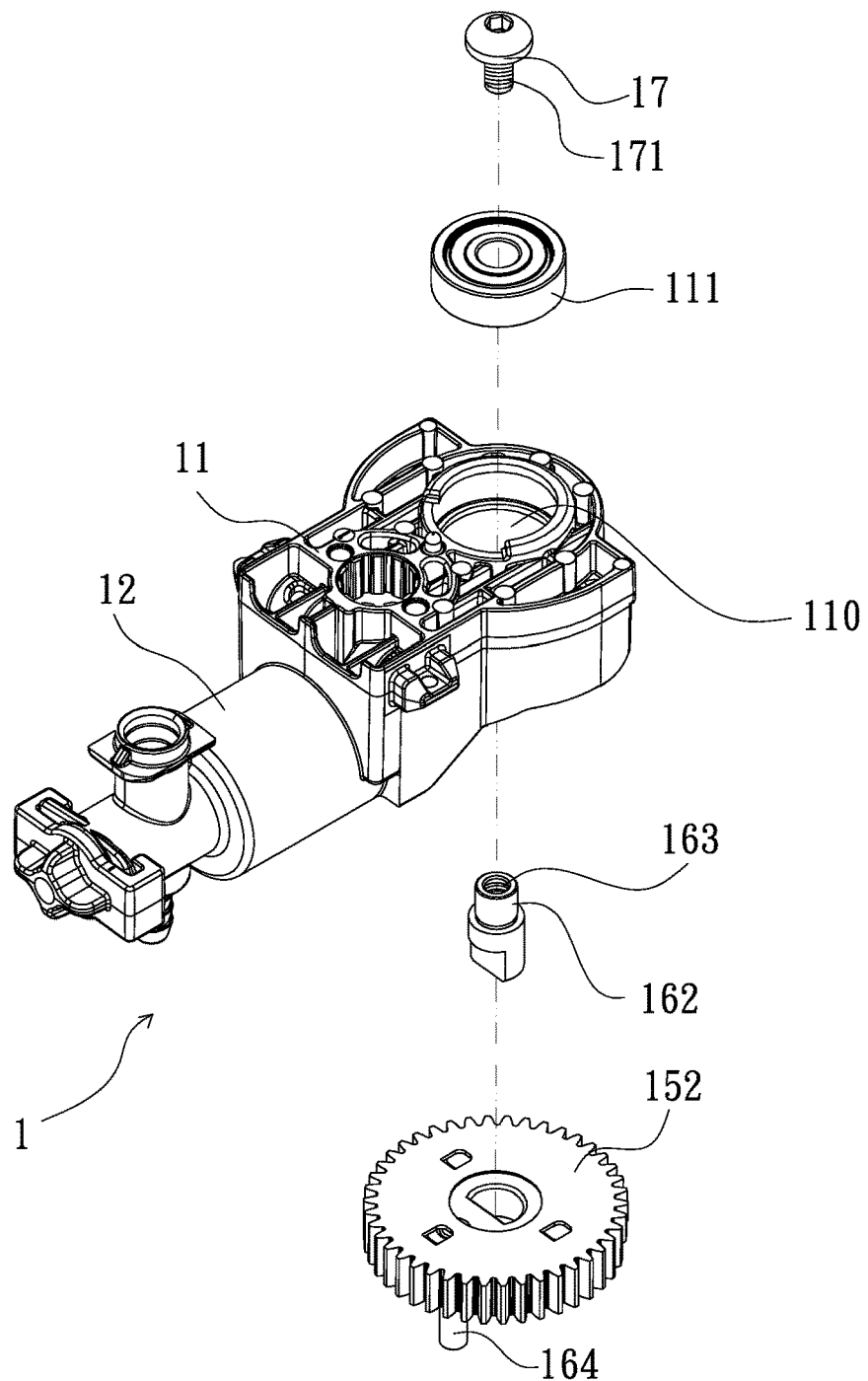
FIG. 9 shows a partial exploded view of a main structure of a second prior-art air compressor.
Figure 10:
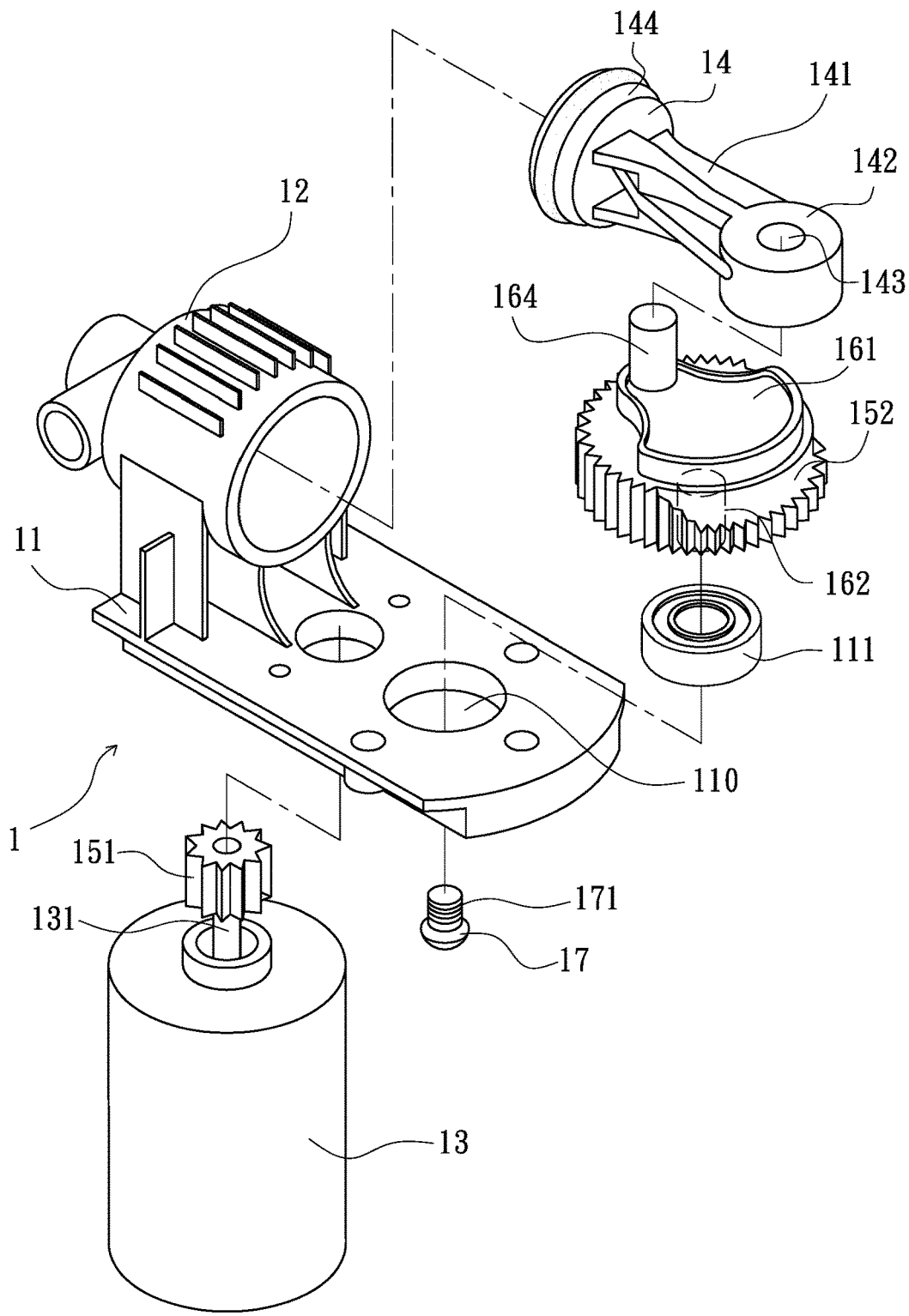
FIG. 10 shows an exploded view of a third prior-art air compressor.
Figure 11:
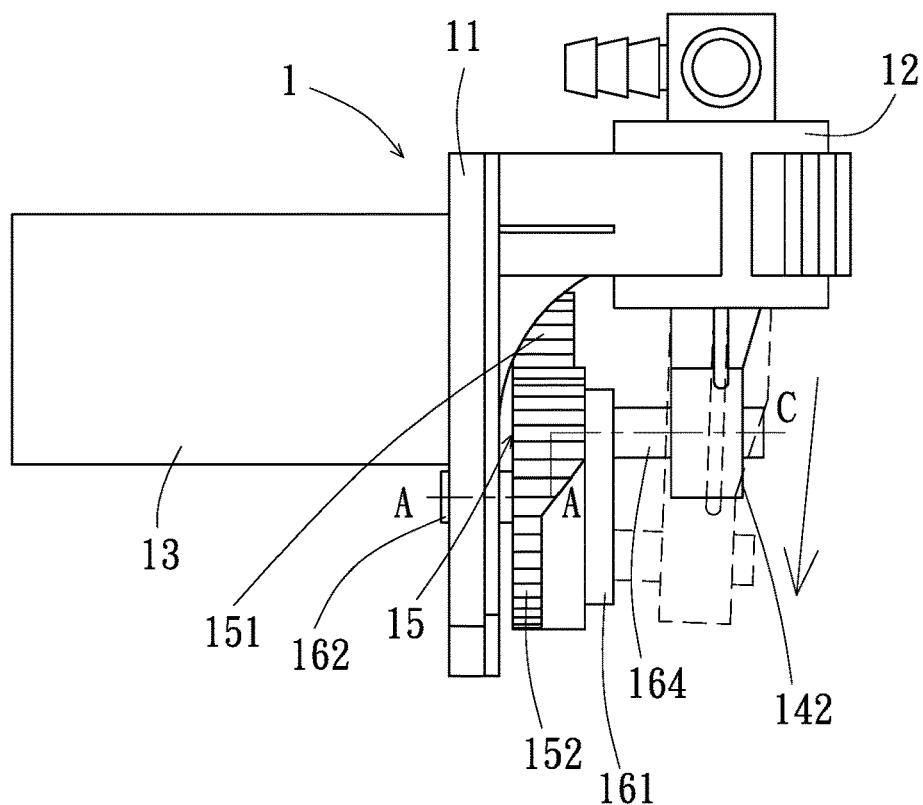
FIG. 11 shows a schematic plan view of the third prior-art air compressor, wherein the motion path of the piston is indicated by dashed lines.
Figure 12:
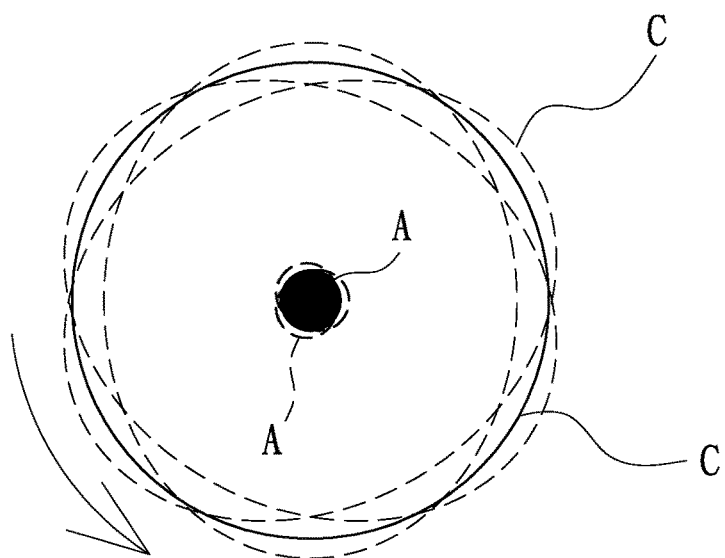
FIG. 12 shows a schematic view of the motion paths of the crankshaft and the crankpin used in a prior-art air compressor.

To facilitate forming an outwardly extending rim 525 on the first end of the shaft element 52, it is preferred that, as shown in FIG. 4, the striking tool 7 includes a shank having a press head 71 at one end, which is provided with a central pin 75 having a diameter (A) slightly greater than the diameter (B) of the central cylindrical recess 524 (see FIG. 5) and defining a depression around the central pin 71. An annular surface 72, which has a level lower than the central pin 75, is formed around the depression. More specifically, the depression is delimited by a concave surface 73 at a bottom of the central pin 75, and a conical surface 74 formed between the concave surface 73 and the annular surface 72. In a hitting operation, the central pin 75 can be inserted into the central recess 524 of the shaft element 52 to applied radial force (F) to the annular peripheral wall of the shaft element 52 (see FIG. 7) to facilitate deformation of the top of the cylindrical wall. With the tool, the outwardly extending rim 525 can be formed into a specific shape, as shown in FIG. 7, wherein the outwardly extending rim 525 is a portion of the shaft element 52 bounded by a first annular tapered surface 523', which is formed by the conical surface 74 of the striking tool 7 urging against the annular surface 523 of the shaft element 52, an annular convex surface 527, which is formed by the concave surface 73 of the striking tool 7 urging against an inner surface of the central cylindrical recess 524 of the shaft element 52 close to the annular surface 523, and a second annular tapered surface 526, which is forced by the central pin 75 to contact the inner ring 62 of the bearing 6.

By using the method of the present invention, the bearing 6 can be firmly mounted with the shaft element 52 in the second mounting hole 32 to prevent possible damages, and the reciprocating motion of the piston 14 can follow its normal straight path. An air compressor, in which the bearing associated with the crankshaft is mounted according to the method of the present invention, the piston can conduct reciprocating motion more smoothly, and thus the performance and service life of the air compressor can be increased.

As a summary, the present invention provides a method of mounting a bearing to an air compressor, and an air compressor, in which a bearing is mounted by using the method. By using a striking tool hitting one end of a shaft element, the bearing can be firmly fixed between an outwardly extending rim and an annular step of the shaft element.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the scope of the invention.

I claim:

1. A method of mounting a bearing to an air compressor which includes: a base frame defining a first mounting hole, which allows a pinion driven by a motor to pass, and a second mounting hole for receiving therein a bearing which has an outer ring, an inner ring defining a central hole, and a plurality of rolling balls disposed between the outer ring and the inner ring; a cylinder fixed to or formed integrally with the base frame; an air storage container provided with one or more outlet tubes and connected with the cylinder; a gear in mesh with the pinion; and a crank mechanism including a counterweight provided on the gear, and a shaft element having a first end and a second end, wherein the second end has a diameter greater than the first end, thus forming an annular step therebetween, the first end of the shaft element having an annular peripheral wall, which defines a central cylindrical recess, and on which an annular surface is formed the method comprising the steps of:
fixing the second end of the shaft element to a center of the gear;
inserting the first end of the shaft element through the central hole of the bearing to have the annular step of the shaft element abutted the inner ring of the bearing; and hitting the first end of the shaft element by a striking tool to form an outwardly extending rim on the first end of the shaft element;

whereby the bearing is firmly fixed between the outwardly extending rim and the annular step of the shaft element.

2. The method of claim 1, wherein the striking tool includes a shank having a press head that is provided with a central pin and has a diameter slightly greater than the central cylindrical recess and defines a depression around the central pin, an annular surface being formed around the depression and having a level lower than the central pin, the depression delimited by a concave surface at a bottom of the central pin, and a conical surface formed between the concave surface and the annular surface.

3. The method of claim 2, wherein the outwardly extending rim is a portion of the shaft element bounded by a first annular tapered surface, which is formed by the conical surface of the striking tool urging against the annular surface of the shaft element, an annular convex surface, which is formed by the concave surface of the striking tool urging against an inner surface of the central cylindrical recess of the shaft element, and a second annular tapered surface, which is forced by the central pin of the striking tool to contact the inner ring of the bearing.

* * * * *